United States Patent Office 3,595,816
Patented July 27, 1971

3,595,816
POLYAMIDE COMPOSITION
Fred O. Barrett, Cincinnati, Ohio, assignor to Emery Industries, Inc., Cincinnati, Ohio
No Drawing. Filed Jan. 31, 1969, Ser. No. 795,706
Int. Cl. C08g 20/20, 51/60
U.S. Cl. 260—18
7 Claims

ABSTRACT OF THE DISCLOSURE

A stabilized polyamide composition prepared from a hydrogenated polymerized fatty acid, a polyfunctional amine, and an oxidation inhibitor having the general formula:

wherein $R_1$ and $R_2$ are aryl or substituted aryl radicals.

BACKGROUND OF THE INVENTION

This invention is concerned with polyamide compositions and more particularly with stabilized polyamide compositions derived from hydrogenated polymerized fatty acids.

Polyamides prepared from polymerized fatty acids have become highly useful commercial products for a number of applications including hot melt adhesives. The characteristics of the polymerized unsaturated fatty acids commonly known as dimer acids, employed in the preparation of hot melt adhesives has been found to be a very important factor in the quantity of the polyamide which is produced. Generally speaking in hot melt adhesive applications it has been found desirable to employ high dimer content polymerized fatty acids because of the improved tensile and elongation properties which are realized. Also, polyamide resins prepared with such polymerized fatty acids are more easily modified with the other constituents of a polyamide resin such as diluent resins, e.g., polymerized maleated rosin esters, low molecular weight polyolefins, aromatic sulfonamides, chlorinated rubbers and the like, without losing the desired properties of the resin.

One of the problems which has been experienced in the use of polymerized fatty acid derived polyamide resins as hot melt adhesives is their susceptibility to oxidation at the high temperatures at which they are used, that is, temperatures of about 150–205° C. These polyamide resins when placed in a molten state form a skin on the surface caused by oxidation. This skin tends to drift through the resin and settles in the resin clogging tubing or application nozzles through which it is passed and results in costly equipment shutdowns while the clogging is removed and the machines are cleaned. Another problem is that the viscosity of the resin is altered by oxidative deterioration, either causing the polyamide resin to increase excessively in viscosity or causing a breakdown in the molecular structure of the resin permitting it to flow too rapidly. Viscosity stability is needed to permit setting of the nozzles or orifices of applicators so that a certain amount of resin is discharged with each application, e.g., to the sole of a shoe.

Much effort has been expended in the past in an attempt to overcome the problems of oxidation of polyamide resins in their molten state. These efforts have included incorporation of a number of oxidation inhibitors into the polyamide resins, but they have met with only marginal success, and the problem of skin formation due to oxidation has remained unsolved.

I have found the stability of polyamide resins containing hydrogenated polymerized unsaturated fatty acids can be markedly improved by the incorporation of certain secondary amines in the polyamide composition. For example, I have found that polyamide resins treated with the oxidation inhibitors of this invention can be maintained in a molten state for periods of up to seven times or more longer without skin formation occurring.

Secondary amines have long been used as oxidation inhibitors for such materials as ester lubricants, rubbers, and plastics, but the unique capacity of the secondary amines forming a part of this invention to stabilize polyamides prepared from hydrogenated polymerized fatty acids was entirely unexpected in view of the ineffectiveness of other similar acting materials with such polyamides and of the relative ineffectiveness of the amines with other types of polymerized fatty acid containing polyamides.

It is therefore an object of the present invention to provide an improved polyamide resin.

Another object of the present invention is to provide a method for inhibiting the oxidation of polyamides containing hydrogenated polymerized unsaturated fatty acids.

Another object is to provide an improved hot melt adhesive.

Still another object is to provide a polyamide resin useful as a hot melt adhesive which is capable of remaining stable at high temperatures for relatively long periods of time.

Other objects of the invention will become apparent from the description of the invention that follows.

DESCRIPTION OF THE INVENTION

The stabilized polyamides resins of the present invention are prepared from a hydrogenated polymerized unsaturated fatty acid, a polyfunctional amine, and an oxidation inhibitor having the general formula:

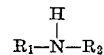

wherein $R_1$ and $R_2$ are selected from the group consisting of:

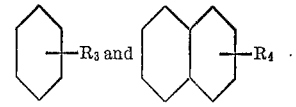

and $R_3$ and $R_4$ are either hydrogen or an alkyl radical having from 4 to 12 carbon atoms.

The hydrogenated polymerized unsaturated fatty acids employed in the present invention are commonly referred to as dimer acids and are predominantly dibasic acids containing from about 22 to about 44 carbon atoms. They are the product of the polymerization of $C_{11}$–$C_{22}$ unsaturated fatty acids. Process for the produltion of polymerized acids are well known and form the subject of numerous United States patents including 2,482,761, 2,793,220, 2,793,221, and 2,955,121. Typically in effecting polymerization of the unsaturated fatty acids, acids such as oleic, linoleic, and linolenic acids, or mixtures of these acids, are heated in the presence of both water and an active clay material to induce polymerization. The polymerized fatty acid reaction product obtained from the polymerization step contains from about 30 to about 75 percent by weight of acid polymer, with the balance of the mixture being monocarboxylic acids of varying types. The monocarboxylic acids are distilled from the mixture once the polymerization operation is concluded. The residual polymer fraction consists essentially of dimer acid together with lesser amounts of trimer acid and monomer acid.

Usually it is desirable in the preparation of polyamide resins useful as hot melt adhesives to use polymerized fatty acids having a high dimer acid content that is, a dimer content of at least 90 weight percent of the total acid content and preferably 95 weight percent or more, with the remainder being primarily trimer acid. High dimer content polymerized fatty acids may be prepared by subjecting the fatty acid polymerization product to a distillation procedure.

The polymerized fatty acids used in the polyamides of the present invention are prepared by hydrogenating under conventional conditions polymerized fatty acids prepared by the methods described above. The hydrogenation may be effected by passing hydrogen into contact with the fatty acid in the presence of a metal catalyst such as nickel, cobalt, palladium, platinum or ruthenium suspended on an inert carrier and in the presence of a clay such as montmorillonite. The hydrogenation is effected at pressures of about 200–1000 p.s.i.g. and at a temperature of about 180–250° C.

To be used in the polyamides of the present invention, the polymerized fatty acids should be hydrogenated to the point of substantially complete saturation and should have an iodine value of from between about 0 and 50, preferably between about 0 and 30. The iodine value indicates a greater degree of unsaturation than is actually present in the polymerized fatty acid molecule because of the occurrence of some substitution by halogen rather than simple addition to the dimer acid molecule. As a practical matter, iodine values of 0 because of substitution are virtually impossible to obtain. When the polymerized fatty acid has been hydrogenated to the point it has an iodine value of 10–30, it has reached a point of substantially complete saturation.

The amines employed in the preparation of the polyamides of this invention are primarily alkylene diamines such as ethylene diamine, propylene diamine, piperazine, aminoethyl piperazine, hexamethylene diamine, and the like. Other amines having greater functionality such as diethylene triamine, triethylene tetramine, and the like may also be used in minor amounts as may monoamines such as morpholine and aliphatic monoamines containing from about 1 to about 20 carbon atoms such as ethylamine, propylamine, pelargonylamine, and stearylamine. In preparing the polyamides of the present invention, from 90–100 equivalent percent of the amine should be a diamine, preferably 95–100 percent, and the remainder may be an amine of higher or lower functionality, but balanced to prevent formation of cross-linked materials which tend to gel. Generally speaking, the level of monoamine employed should be approximately equal to the amount of trimer acid contained within the polymerized unsaturated fatty acid.

In addition to the hydrogenated polymerized fatty acids, other carboxylic acids including both mono- and dicarboxylic acids may be used in the preparation of the polyamides of the instant invention. The dicarboxylic acids may be alkylene dicarboxylic acids containing from 4 to 12 carbon atoms such as adipic acid, azelaic acid, or sebacic acid, or aromatic dibasic acids such as terephthalic acid or isophthalic acid. These dibasic modifying acids may be used in amounts of from 0–50 equivalent percent, preferably 10–30 equivalent percent based on the total equivalents of carboxylic acid employed. The monomeric acid may be used in amounts of from 0–10 equivalent percent based on the total equivalents of carboxylic acid and may include aliphatic monocarboxylic acids having from 1 to about 10 carbon atoms.

The secondary amine oxidation inhibitors of this invention are compounds conforming to the general formula:

$$R_1-\underset{\underset{H}{|}}{N}-R_2$$

wherein $R_1$ and $R_2$ are selected from the group consisting of:

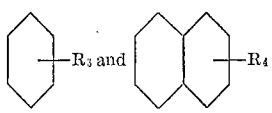

and $R_3$ and $R_4$ are either hydrogen or an alkyl radical having from 4 to 12 carbon atoms, preferably 8 or 9 carbon atoms.

Specific examples of oxidation inhibitors useful in the present invention are diphenylamine, para,para-dioctyldiphenylamine, para-octylphenyl, naphthylamine, and phenyl, naphthylamine.

The secondary amine oxidation inhibitors may be used in amounts of from about 0.1–5.0 percent by weight based on the total weight of the polyamide resin. Preferably they should be used in amounts of from about 0.5–1.5 percent by weight, the optimum amount varying with the particular secondary amine employed.

One preferred embodiment of the present invention is a polyamide resin comprising 81 equivalent percent by weight of hydrogenated polymerized fatty acid, 4 equivalent percent by weight of stearic acid, 15 equivalent percent by weight of azelaic acid, 100 equivalent percent ethylene diamine, and 1 percent by weight of para, para-dioctyldiphenylamine.

The outstanding stabilizing effect of the secondary amines of the present invention when used with polyamides is peculiar to polyamides prepared from hydrogenated polymerized fatty acids. The secondary amines will provide some improvement in the stability of polyamide resins derived from unhydrogenated polymerized fatty acids, but the improvement does not compare with the dramatic effect realized with polyamide resins prepared from hydrogenated polymerized fatty acids. Polyamide resins prepared from hydrogenated polymerized fatty acids show a seven-fold or more improvement in their oxidative stability and are able to remain stable for 40–50 hours or more in a molten state. This discovery was entirely unexpected, particularly in view of the ineffectiveness of other oxidation inhibitors, such as the hindered phenols, e.g., butylated hydroxy toluene, substituted hydroquinones, e.g., tri (3,5 - tert-butyl-4-hydroxy phenyl) phosphate, when used with polyamide resins derived from hydrogenated polymerized unsaturated fatty acids.

The polyamide resins of this invention may be prepared by reacting the amine and acid components in proportions such that substantially equivalent amounts of amine and acid are used in the reaction mixture. The amine and acid ratios may vary from the preferred 1:1 ratio so long as the acid number of the polyamide does not exceed about 50 and the amine number does not exceed about 50. The preferred reaction procedure is to heat the acid components in the reaction vessel to about 160–180° C. and then slowly add the amine mixture thereto. After addition of the amine, the temperature is gradually increased to about 200–250° C. The reaction may be carried out at temperatures within the range of about 150–350° C., preferably about 200–250° C., the latter temperatures being the finishing temperatures. Water produced in the reaction is withdrawn. Normally the reaction proceeds for about 2 up to about 20 hours after the desired temperature (about 250° C.) has been reached. One example of satisfactory reaction conditions is a reaction temperature of 220–230° C. for a period of about 6 hours. A vacuum is applied to facilitate the removal of volatile products from the reaction, usually at the end or in the finishing stage of the reaction. An alternative procedure is to charge all of the reactants into the reaction vessel together and then apply heat within the ranges and times indicated above.

The secondary amine oxidation inhibitor may be incorporated into the polyamide resin by adding it to the starting materials used in the preparation of the resin or to the molten finished resin. If incorporated in the starting reactants, some of the inhibitor may be lost when the resin is hot and under vacuum. Nevertheless, it is often desirable to add the oxidation inhibitor, at least in part, at the outset because it tends to prevent the initiation of sequester unwanted side reactions in the preparation of the polyamides. Thus the inhibitors of this invention may have a two-fold benefit, (1) the control of the reaction in preparing the polyamides and (2) the stabilization of the polyamides after preparation.

The following examples are provided to further illustrate the invention, but they are not to be construed as limitative of the scope thereof.

EXAMPLE 1

A polyamide resin was prepared in the following manner: 0.81 equivalents of Empol 1010, a hydrogenated polymerized fatty acid having a dimer acid content of 98 percent, a trimer acid content of 2 percent, and a trace of monomer and an iodine value of 15, 0.04 equivalents of stearic acid, and 0.15 equivalents of azelaic acid were heated to a temperature of 160° C. in the presence of 0.1 percent by weight of a phosphoric acid catalyst. One equivalent of ethylene diamine was then slowly added to the molten carboxylic acid mixture. When addition was completed, the reactants were heated to 250° C. and held at that temperature for about 1 hour while water was withdrawn. The reaction product was then put in a vacuum for an hour at 250° C. to remove any residual water. Following the vacuum treatment, 0.5 percent by weight of para,para-dioctyldiphenylamine was added to a portion of the polyamide product and stirred in thoroughly.

EXAMPLE 2

The same procedure was employed as in Example 1 in the preparation of a polyamide except that 0.83 equivalents of Empol 1014, a non-hydrogenated polymerized fatty acid having an iodine value of [1] 100, 0.01 equivalents of stearic acid, 0.16 equivalents of adipic acid were used as the acid reactants and a mixture of 0.2 equivalents of hexamethylene diamine and 0.8 equivalents of ethylene diamine were slowly added to the heated acids as the amine reactants.

EXAMPLE 3

A polyamide was prepared as in Example 1 except that one percent by weight of para,para-dioctyldiphenylamine was added instead of 0.5 percent.

The oxidative stability of the polyamide resins described above was determined by placing 10 gram samples of each of the resins in aluminum dishes and then placing the samples in a circulating air-type oven at temperatures of 190° C. and 205° C. The length of time before skin formation or gelation occurred was noted, the skin formation or gelation indicating that oxidation had occurred. The results are shown in Table I.

TABLE I

| Example No. | Polyamide resin | Time before skin formation occurs (hours) | |
|---|---|---|---|
| | | 190° C. | 205° C. |
| 4 | Polyamide of Ex. 2 before addition of the antioxidant. | [1] 2 | [1] <2 |
| 5 | Polyamide resin of Example 2 | [1] 6 | 4 |
| 6 | Polyamide resin of Ex. 1 before addition of the antioxidant. | 6 | 4 |
| 7 | Polyamide resin of Example 1 | 42–54 | 14 |
| 8 | Polyamide resin of Example 3 | 42–54 | 32 |

[1] Gel.

From the foregoing tests it may be seen that a very substantial improvement is realized in the oxidative stability of polyamide resins to which a diarylamine oxidation inhibitor of the present invention has been added. The data shows that some improvement in oxidative stability of polyamides prepared from unhydrogenated polymerized fatty acids may be achieved by incorporation of a diarylamine, but that very substantial improvement is realized by the use of such materials with polyamides derived from hydrogenated polymerized fatty acids as is shown in Examples 7 and 8.

EXAMPLES 9 and 10

To further illustrate the advantages of the present invention, the viscosity change with time was noted for the polyamide resins of Examples 1 and 2 and that data is provided below along with comparative data for a hydrogenated polymerized fatty acid containing polyamide without an antioxidant.

Polyamide resin of Example 2

| Hours at 190° C.: | Percent viscosity change |
|---|---|
| 16.5 | 12 |
| 24 | 11 |
| 42 | 20 |

Polyamide resin of Example 1

| Hours at 190° C.: | Percent viscosity change |
|---|---|
| 4 | +4.2 |
| 21 | +4.2 |
| 25 | +0.8 |
| 29 | −3.4 |
| 49 | −7.9 |
| 52 | −15.6 |
| 24 [1] | 23 |

[1] Before addition of antioxidant.

This data illustrates the very striking improvement in viscosity change which is achieved with the polyamide resins of the present invention derived from a hydrogenated polymerized fatty acid as compared with an unhydrogenated polymerized fatty acid or with untreated polyamides prepared from hydrogenated polymerized fatty acids.

Obviously, many modifications and variations of the invention as hereinbefore set forth may be made without departing from the spirit and scope thereof, and therefore, only those limitations should be imposed as are indicated in the appended claims.

I claim:

1. A stabilized polyamide composition comprising the reaction product of carboxylic acid and amine, said carboxylic acid comprising at least fifty equivalent percent based on the total acid components of a substantially completely hydrogenated polymerized unsaturated $C_{11}$–$C_{22}$ fatty acid and said amine comprising at least ninety equivalent percent based on the total amount of amine of a polyamine selected from the group consisting of aliphatic polyamines, aminoethyl piperazine, and piperazine, said polyamide containing as an oxidation inhibitor a compound having the general formula:

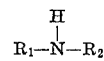

wherein $R_1$ and $R_2$ are selected from the group consisting of:

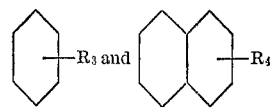

and $R_3$ and $R_4$ are either hydrogen or alkyl radicals having from 4 to 12 carbon atoms.

2. The polyamide composition of claim 1 wherein substantially equal equivalents of amine and carboxylic acid are used in the preparation of said polyamide.

3. The polyamide composition of claim 1 wherein 0 to 50 equivalent percent, based on the total equivalents of acid used in the preparation of said polyamide, of a dicarboxylic acid having from about 4 to 12 carbon atoms is used as a portion of the carboxylic acid of said polyamide.

4. The polyamide of claim 3 wherein from 0 to 10 equivalent percent, based upon the total equivalents of acid used in the preparation of said polyamide, of an aliphatic monocarboxylic acid having from 1 to 20 carbon atoms is employed.

5. The composition of claim 2 wherein the amine comprises from 90 to 100 percent of a diamine.

6. The composition of claim 5 wherein said amine is selected from the group consisting of alkylene diamines having from 1 to 10 carbon atoms, piperazine, and aminoethyl piperazine.

7. The composition of claim 6 wherein said amine is ethylene diamine.

References Cited

UNITED STATES PATENTS

| | | | |
|---|---|---|---|
| 3,297,730 | 1/1967 | Fischer | 260—407 |
| 3,398,164 | 1/1968 | Rogier | 260—18N |
| 3,425,985 | 2/1969 | Freytag et al. | 260—45.9 |
| 3,452,056 | 6/1969 | Sundholm | 260—45.9 |
| 3,496,230 | 2/1970 | Kaplan | 260—45.9 |

FOREIGN PATENTS

| | | | |
|---|---|---|---|
| 1,000,216 | 8/1965 | Great Britain | 260—18N |

DONALD E. CZAJA, Primary Examiner

E. C. RZUCIDLO, Assistant Examiner

U.S. Cl. X.R.

260—45.9, 404.5, 409